United States Patent [19]

Carrico

[11] 4,087,504
[45] May 2, 1978

[54] THERMOPLASTIC COOLING METHOD

[75] Inventor: Philip Hugh Carrico, Greenfield Center, N.Y.

[73] Assignee: General Electric Company, Hudson Falls, N.Y.

[21] Appl. No.: 705,809

[22] Filed: Jul. 16, 1976

Related U.S. Application Data

[62] Division of Ser. No. 553,934, Feb. 28, 1975, Pat. No. 4,008,022.

[51] Int. Cl.² .......................................... B29D 23/04
[52] U.S. Cl. ....................................... 264/89; 264/95; 264/169; 264/209; 264/237; 264/348
[58] Field of Search .................. 264/95, 89, 209, 169, 264/39, 85, 176 F, 347–348, 236–237; 425/379, 326 R, 387 R, 71, 72

[56] References Cited

U.S. PATENT DOCUMENTS

| | | | |
|---|---|---|---|
| 2,581,231 | 1/1952 | Berggren | 264/347 |
| 3,129,272 | 4/1964 | Ferrier et al. | 264/176 F |
| 3,284,552 | 11/1966 | Haley | 264/89 |
| 3,331,901 | 7/1967 | Thomas | 264/95 |
| 3,426,111 | 2/1969 | Simpson | 425/379 |
| 3,655,846 | 4/1972 | Kanoh et al. | 264/95 |
| 3,661,482 | 5/1972 | Brown, Jr. | 264/95 |
| 3,891,374 | 6/1975 | Nimomiya et al. | 264/89 |
| 3,985,931 | 10/1976 | Blackwelder | 264/95 |
| 3,990,828 | 11/1976 | Reifenhäuser | 425/326 R |

Primary Examiner—Jeffery R. Thurlow
Attorney, Agent, or Firm—James J. Lichiello

[57] ABSTRACT

A cooling system for quenching extruded thermoplastic tubing which moves in a vertically upward direction from a die to a cooling mandrel comprises a seal means between the die and the mandrel and the introduction of cooling fluid such as water between the seal and the mandrel to flow upwardly as the tube passes along the mandrel. A water vapor atmosphere below the seal provides a controlled atmosphere leaking past the seal which condenses immediately upon passing the seal and coming into contact with the cooling fluid. This controlled atmosphere avoids air leakage past the seal and consequent imperfections in the thermoplastic material tube.

6 Claims, 3 Drawing Figures

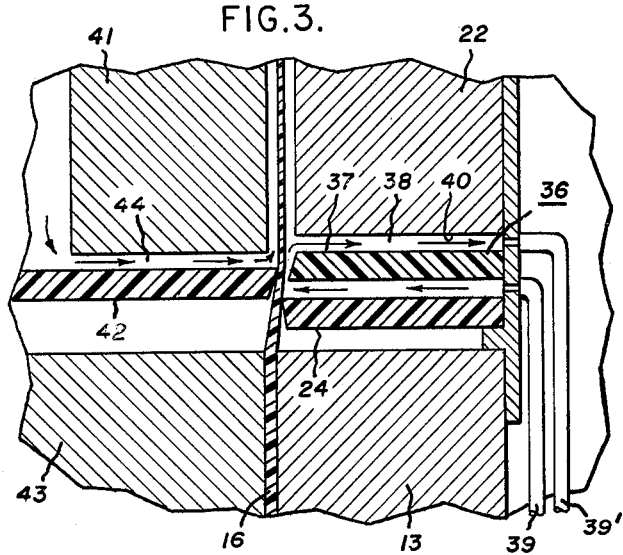
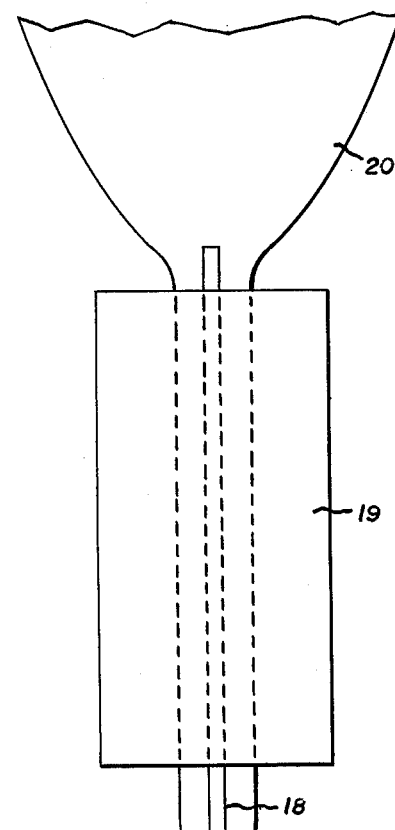
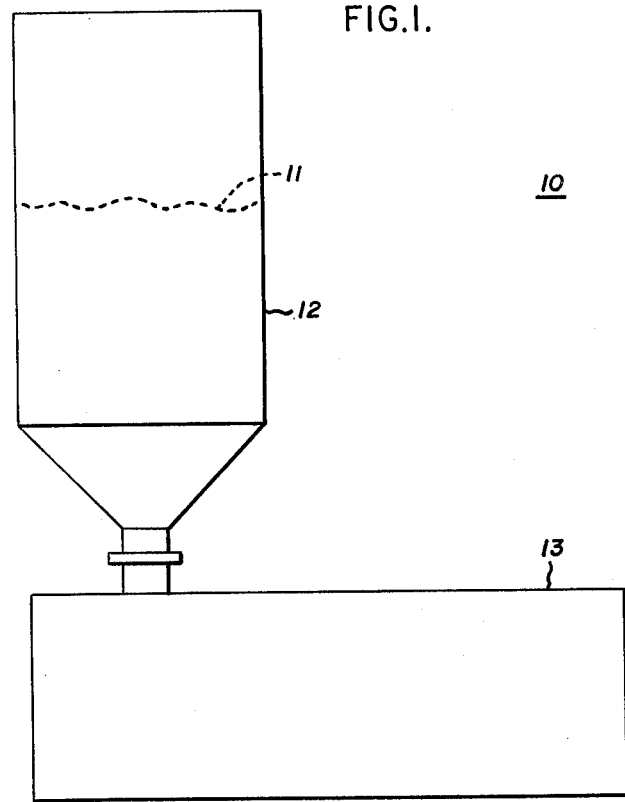

4,087,504

THERMOPLASTIC COOLING METHOD

This is a division of application Ser. No. 553,934, filed Feb. 28, 1975, now U.S. Pat. No. 4,008,022 assigned to the same assignee as the present invention.

BACKGROUND IF THE INVENTION

This invention relates to a method and apparatus for the cooling of a thermoplastic material tubular stalk as it is being extruded from an extruder. More particularly, the invention relates to polypropylene stalk cooling applied to a polypropylene stalk moving vertically upwards. In the production of polypropylene film from polypropylene resin, the resin is usually extruded from an extruder die in the form of a tube or cylinder of molten polypropylene. This tube or cylinder of polypropylene is caused to move along and around a cooling mandrel for solidification or crystallization of the polypropylene. After the polypropylene tube is caused to solidify, it is pulled along the mandrel over a disc tube seal through a pair of nip rolls. Above the nip rolls the tube is reheated and air is introduced in to the tube to biaxially stretch the tube into a large bubble formation. In this kind of a process, it is important that the polypropylene material be stretched at a temperature below its crystalline melting point to insure an increase in strength on stretching. Consequently, the polypropylene is first quenched or cooled by drawing it over the cooling mandrel at a rate which tends to stretch the stalk. This causes a formation of very small crystallites in the polypropylene and enables the polypropylene to be readily stretched when reheated to a stretching temperature.

Utilization of solely internal cooling of the mandrel to cool the polypropylene stalk by metal contact is limited because of the cooling capacity of the mandrel within a satisfactory axial length, instability of sliding friction between the stalk and the mandrel, and an overall non uniform cooling which causes consequent imperfections in the film made from the stalk.

OBJECTS OF THE INVENTION

Accordingly, it is an object of this invention to provide an improved polypropylene stalk cooling method and apparatus.

It is another object of this invention to provide an improved mandrel cooling process for a vertically upwardly moving polypropylene material stalk.

It is another object of this invention to provide an improved seal means for polypropylene stalk cooling.

SUMMARY OF THE INVENTION

In one preferred form of this invention, a tube or stalk of molten polypropylene emanating from an extruder die is caused to move upwardly and coaxially over a sharp edge cylindrical seal which is spaced from a coaxial cooling mandrel. Water is introduced between the mandrel and the seal to flow upwardly along the mandrel as a very thin film between the mandrel and the tube by the action of the tube being drawn over the mandrel. At the same time a steam atmosphere is introduced below the seal so that any leakage past the seal will be leakage of steam which immediately condenses when it comes in to contact with a cooling fluid on the other side of the seal. By this means air leakage is eliminated from the cooling area and the cooling process becomes quite uniform leading to greater clarify film and film with lesser imperfections caused by the non uniformity of the cooling process.

DESCRIPTION OF THE DRAWINGS

This invention will be better understood when taken in connection with the following description and drawings in which:

FIG. 1 is a schematic illustration of a blown tube or bubble process for producing polypropylene film.

FIG. 3 is a partial and cross sectional view of a modification of the cooling means of FIG. 2.

DESCRIPTION OF PREFERRED EMBODIMENTS

Figure 2:
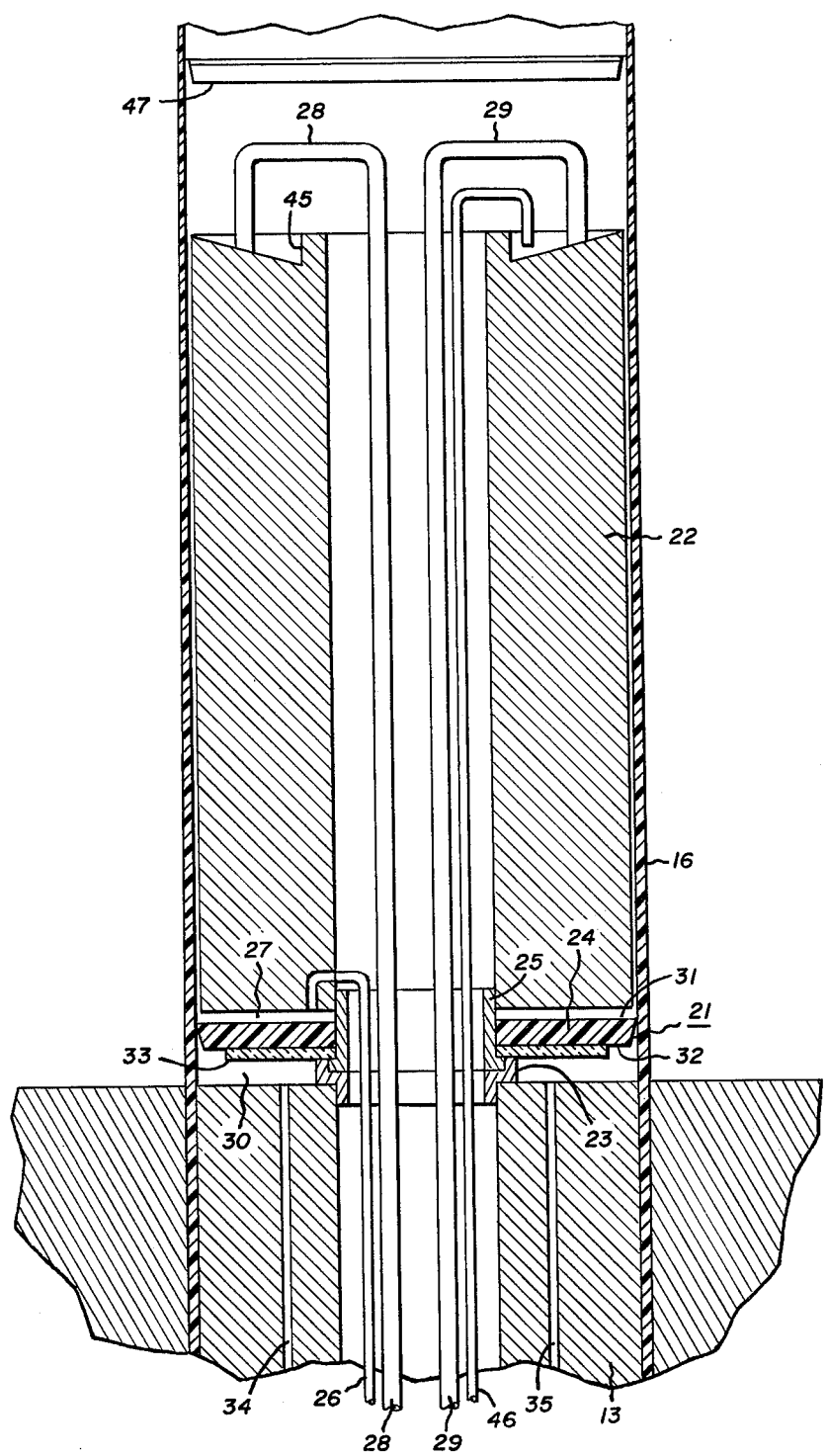
FIG. 2 is a partial and cross sectional illustration of the seal and mandrel cooling process and apparatus of the present invention.

Referring now to the blown tube apparatus 10 of FIG. 1, polypropylene resin in the form of resin pellets 11 are fed into a hopper 12 and then into an extruder 13 where they are heated to form a very soft or molten mass of polypropylene. This mass is extruded from the extruder 13 through a die 14 and comes into contact with a cooling mandrel 15 where it begins to crystallize in the form of a stalk 16. From the cooling mandrel 15, the stalk 16 passes through a pair of nip rolls 17 which compress the stalk in sealing relationship to an air tube 18 which passes therebetween in a groove in the rolls 17. After passing the rolls 17, the stalk 16 is reheated to its softening temperature by a suitable heating means 19, for example, radiant heaters, and then insufflated by introducing air under pressure through tube 18. Insufflation provides a controlled bubble or large tube 20 which stretches the polypropylene stalk in both the horizontal and vertical direction by a factor of 6 to provide biaxially oriented polypropylene film. The bubble 20 is then collapsed between a further pair of nip rolls (not shown) and hauled off to a slitter where the bubble is slit into one or more widths which are then wound on a takeup winding roll. Typical structures in processes for producing films from a blown tube process are found in U.S. Pat. Nos. 2,720,680—Gerow; 3,235,632—Lemmer; and 3,223,764—Conn.

The improved mandrel cooling means of this invention is best illustrated and described with respect to FIG. 2. Referring now to FIG. 2, there is illustrated a seal means 21 in combination with a mandrel 22. Seal means 21 includes an insulating and centering ring 23 which is positioned between the die 13 and the mandrel 22 and acts as a centering ring for the mandrel 22, the die 13 and the seal means 21. Ring 23 also heat insulates the mandrel 22 from the die 13. Seal means 21 also comprises a rigid plate or washer seal 24 which is secured to the underside of mandrel 22 by means of a centering cylinder 25 in combination with the centering ring 23. A suitable non metallic plate such as glass laminate washer 33 is positioned against the underside of the plate seal 24 so that condensation at the lower surface of seal 24 is minimized. In the practice of this invention, polypropylene stalk 16 which emanates from the die 13 at about 450° F comes into contact with the plate 24 and moves coaxially over the mandrel 22. At the same time a cooling fluid such as water is introduced through conduit 26 to be introduced into the space 27 between plate seal 24 and mandrel 22. The action of the stalk 16 in passing over the plate seal 24 and mandrel 22 causes a thin film of water to pass upwardly between the stalk 16 and the mandrel 22 to serve both as a lubricant for the stalk 16 and as a uniform cooling film or heat transfer medium. Water pressure for the water in space 27 must be kept at a minimum to prevent the distension of the stalk 16 away from mandrel 22 with consequent loss of effective and uniform cooling. The action of the stalk moving over and in close contact with plate 24 may cause the water film to move upwardly through a capillary action, however, there seems to be some additional pumping action taking place. The water layer or liquid film between the stalk 16 and the mandrel 22 is very thin, ordinarily less than about 10.0 mil thickness, so consequently there is very little internal pressure tending to cause the stalk to break away from either the mandrel 22 or the plate 24. For this reason the mandrel height is not limited. Heat from the polypropylene stalk 16 is transferred through the liquid layer and through the solid mandrel 22 for effective cooling since the solid mandrel is also cooled by means of a cooling fluid being circulated therethrough by conduits 28 and 29. Water collection means in the form of a groove 45 in mandrel 22 collects water from the water film which is then drawn off through conduit 46,. Seal 47 may also contribute to this function.

Polypropylene film as a capacitor dielectric must be of a very good and very clean grade of polypropylene with minimum imperfections, minimum bagginess, and minimum non uniformity in thickess. Polypropylene film having these excellent characteristics is referred to as capacitor grade polypropylene film. During the operation of the described apparatus and process, it was found that air in the space 30 between the plate seal 24 and the die 13 was caused to moved past the plate seal 24 and mix with the cooling water. This leakage caused profuse imperfections in the polypropylene film surface because it interrupted the cooling of those parts of the film which were in contact with the entrained air. These imperfections in the stalk resulted in increasingly larger imperfections in the final polypropylene film of the bubble 20 in FIG. 1 after passing through the reheating and bubble stretching process. Polypropylene film obtained from the bubble 20 of this process finds primary application as a dielectric medium in electrical capacitors. It has been discovered that the atmosphere within space 30 should be the vapor atmosphere of the fluid being used for cooling. For example, when the cooling fluid for mandrel 22 is water the space 30 should contain water vapor or preferably steam, to the exclusion of air. The pressure of the steam atmosphere in space 30 is about equivalent to the pressure of the cooling water flowing in the space 27. When the action of the stalk 16 causes a leakage past plate seal 24 of the atmosphere in space 30, that atmosphere, when it is steam, comes directly into contact with the cooling water in space 27 where it is immediately condensed. Air entrainment transient bubbles passing along the mandrel, and uneven cooling are eliminated or minimized. As a result, the improvement noted by the use of the steam atmosphere in the present invention is quite marked and easily verified by visual examination.

The cooling of the stalk 16 in the short axial length between the plate seal 24 and mandrel 22 is quite critical. It is essential not to have too much or too little cooling water at this point. Accordingly, it has been found that the axial dimension of the space 27 should be controlled within narrow limits. As noted, the temperature of the molten polypropylene is about 450° F and consequently boiling of the water is a serious problem to effective water cooling. A gap of less than about 90 mils and preferably between about 10 to 50 mils in the axial dimension has provided excellent results in this invention with a plate seal 24 of about 40 inches diameter. A gap of less than about 3.0 inches in axial dimension is preferred for space 30.

An important factor in the present invention is the configuration of plate seal 24. Plate 24 in the preferred form of this invention should be a sharp edge seal, i.e. that the outer circumference should form a sharp edge where it comes into contact with stalk 16. As illustrated in FIG. 2, the outer circumference of plate 24 is tapered so that the plate is frustoconical with the larger diameter surface 31 facing upwardly toward mandrel 22 and the smaller diameter surface 32 facing downwardly toward die 13. It has been found that with round edged plates the cooling fluid flowing through the space 27 comes into contact with the stalk 16 over an increased axial dimension because of the curvature, and that some of the fluid between the curvature of the plate and the stalk 16 is in a groove like depression and fails to circulate properly giving hot spots and non uniform cooling at this circumferential area of the stalk. It is also preferred that the plate 24 be composed of a material suitable to the frictional characteristics between the plate 24 and the stalk 16, the temperatures involved, and the cooling characteristics. A suitable plate material is Vespel SP211 (trademark DuPont) and other carbon and teflon filled polyimides. Since the bottom side of the plate seal 24 is relatively cold, steam condenses forming droplets and these droplets fall on die 13 and move around in space 30 to eventually come in contact with the polypropylene stalk leaving marks in the final film. Therefore an insulating washer 33 of a material such as a glass laminate is placed under plate seal 24 adjacent the surface 32.

The diameter of the plate seal 24 in relation to the diameter of the bottom of the mandrel 22 is also an important factor. Plate seals which have performed satisfactory have been about 10 mils larger in diameter than the bottom of mandrel 22. Plate seals on the order of 1–2 mils larger than the mandrel base give poorer results and plate seals which are in the order of 20 mils larger also provide unsatisfactory performance. One of the reasons for this unsatisfactory performance is that heat transfer is retarded thus leading to boiling and marking of the film.

In passing along the mandrel 22 the stalk shrinks significantly, about 2–3% as it is cooled. Such cooling can take place on mandrels which are from about 12 to about 20 inches in length. In either event, it is beneficial to provide some taper from the bottom diameter of the mandrel to the top diameter and a taper of about 2 mils per inch of length has been employed with good results.

In the practice of this invention with a die 13 of about 4.0 inches diameter, deaerated water was supplied to space 27 at about 0.1 pounds per square inch. About 60 ml. of water per minute is pumped up a mandrel of about 12 inches as the water film. This film is essentially a heat transfer medium and ordinarily carries little if any heat away from the stalk 16. It is also of about 1.0 mil or less in thickness and consequently is not a barrier to heat transfer. Steam is pumped into the space 30 through conduit 34 and vented out through conduit 35 to provide a continuous purging flow of steam. Steam is maintained at a constant pressure of 3.0 to about 10.0 inches of water and preferably from 4 to 6. Stalk 16 is from about 6.0 to 35.0 mils wall thickness and moving from about 15 to 70 feet per minute.

The present invention relates to an improved cooling process and apparatus for particularly polypropylene film making. The cooling which is accomplished is accomplished through a very thin layer of water, for example, about 1 mil in thickness. It is an important feature of this process that the initial cooling of the stalk as it emanates from the die takes place in a very precise and uniform manner with the cooling water being directed to a specific and controlled part of the polypropylene stalk. In other words, the cooling of the stalk starts at a precise location circumferentially of the stalk and with precise uniformity and with a precise positioning adjacent die 13.

In FIG. 3 there is shown a modification of FIG. 2 in that the cooling process of the present invention may be applied both to the internal surface of the stalk and to the external surface of the stalk. Referring now to FIG. 3, there is shown a die 13, a spaced mandrel 22, and a modified seal means 36. As a modification there is provided a second plate seal or washer 37 spaced from plate seal 24 so as to define a return fluid circulation passage 38. In the practice of this invention, as the stalk 16 moves out of die 13 and over mandrel 22, fluid such as water is circulated through conduit 39 and into the space 38 between the plate seals 24 and 37. This fluid then circulates upwardly and out through passageway 40 and conduit 39. Part of the cooling fluid, however, moves upwardly between the stalk and the mandrel 22 as described with respect for FIG. 2.

On the outside of the stalk there is an annular or coaxial mandrel member 41, an annular plate seal 42, and an annular die block 43. The external cooling of the stalk is carried on in much the same way as described in FIG. 2, i.e, that the cooling fluid circulates into a space 44 between the plate seal 42 and the mandrel 41, and is drawn upwardly between the stalk and the outside or circumferential mandrel 41 as described with respect to FIG. 2. In order to provide the proper contacts in the FIG. 3 modification, plate seal 24 is of a significantly greater diameter than mandrel 22. By the same token, the annular seal 42 has an inside diameter lesser than the outside diameter of plate seal 24 and less than the inside diameter of annular mandrel 41. When the two seals 42 and 24 are brought into uniformity the annular plate seal 42 engages the stalk at a point upwardly from the corresponding engaging point of the plate seal 24 and stalk 16 so that there is an overhang. Ordinarily the annular parts are lowered into place after the stalk of FIG. 2 has been established. The spacing defined between the annular mandrel 41 and the mandrel 22 must be on the order of about 10 mils and this manner stalk has been made with cooling taking place simultaneously on both the inside and the outside of the stalk.

While this invention has been disclosed with respect to particular embodiments and processes thereof, numerous modifications may be made by those skilled in the art without departing from the true spirit or scope. Therefore, it is intended that the appended claims cover all such modifications and variations which come within the true spirit and the scope of the present invention.

What is claimed as new and desired to be secured by Letters Patent of the United States is:

1. A process for cooling a polypropylene tubular stalk which emanates from a die and passes upwardly over a cooling mandrel comprising
    a. positioning an upwardly facing beveled edge seal between said die and said mandrel to define a thin space above said seal and to engage the periphery of the tube in sealing relationship,
    b. introducing deaerated water at low pressure into said thin space above said seal to be taken up by the action of said stalk passing over said beveled edge and flow as a heat transfer film over said mandrel,
    c. and introducing steam at low pressure below said seal to leak past said seal and condense in contact with the water in said space.

2. The invention as recited in claim 1 wherein said seal is from about 2.0 to 10.0 mils larger in diameter than the diameter of the mandrel, and is positioned adjacent said die.

3. The invention as recited in claim 2 wherein said stalk is maintained between 6.0 and 35.0 mils in wall thickness and is moved over the mandrel at about 15 to 70 feet per minute.

4. The invention as recited in claim 3 wherein said steam is maintained in a pressure range of between 30 and 10.0 inches of water.

5. The invention as recited in claim 4 wherein said water pressure is about 0.1 pounds per square inch and said mandrel is less than about 20 inches in length.

6. The invention as recited in claim 5 wherein said periphery is the external periphery of said stalk.

* * * * *

UNITED STATES PATENT AND TRADEMARK OFFICE
CERTIFICATE OF CORRECTION

PATENT NO. : 4,087,504
DATED : May 2, 1978
INVENTOR(S) : Philip Hugh Carrico

It is certified that error appears in the above-identified patent and that said Letters Patent are hereby corrected as shown below:

Column 1, line 68, change "clarify" to -- clarity --

Column 4, line 58, after "inches" insert --length --

Column 6, Claim 4, line 2, change "30" to -- 3.0 --

Signed and Sealed this

Twenty-ninth Day of August 1978

[SEAL]

Attest:

RUTH C. MASON
Attesting Officer

DONALD W. BANNER
Commissioner of Patents and Trademarks